United States Patent Office 3,501,940
Patented Mar. 24, 1970

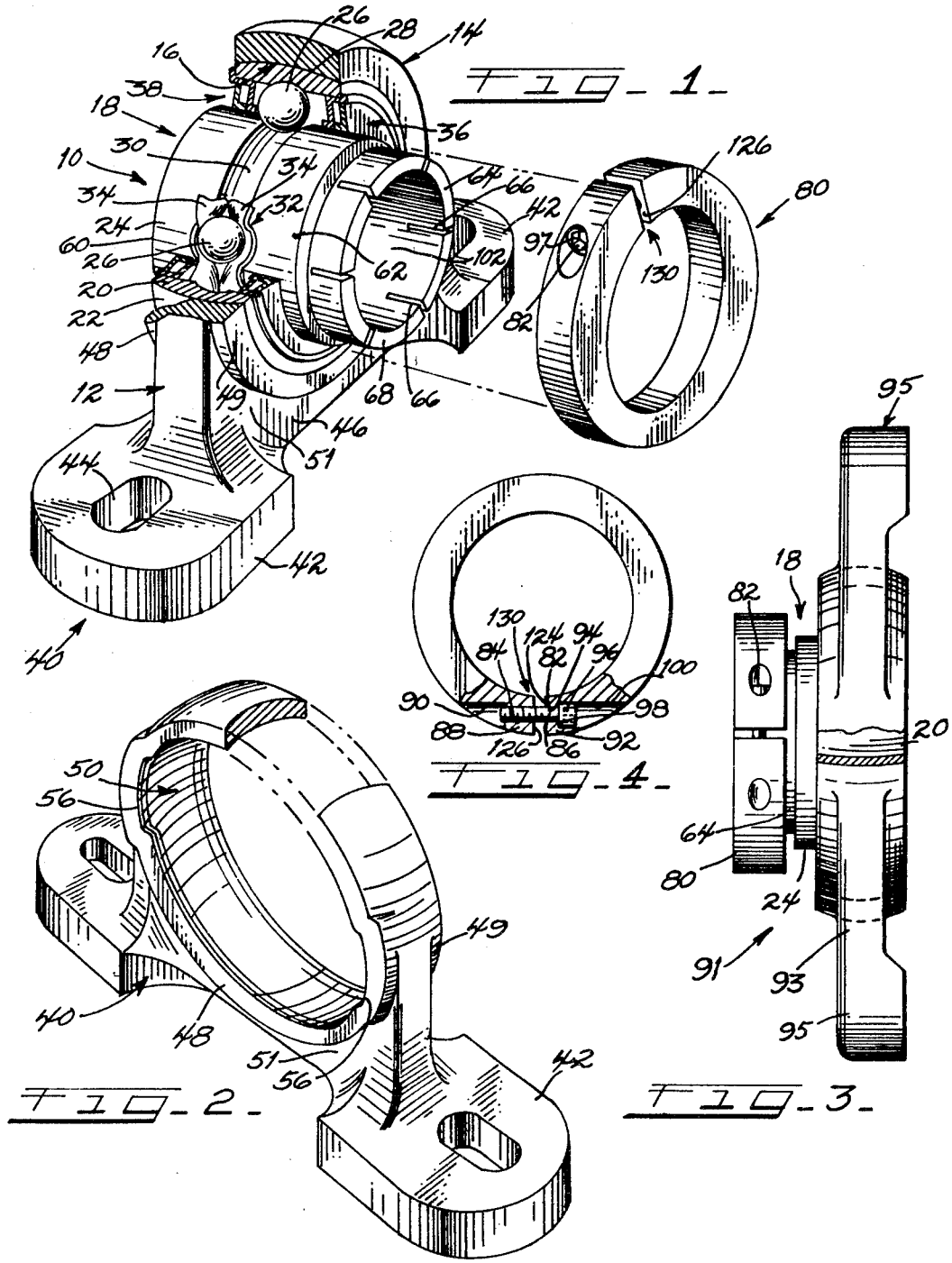

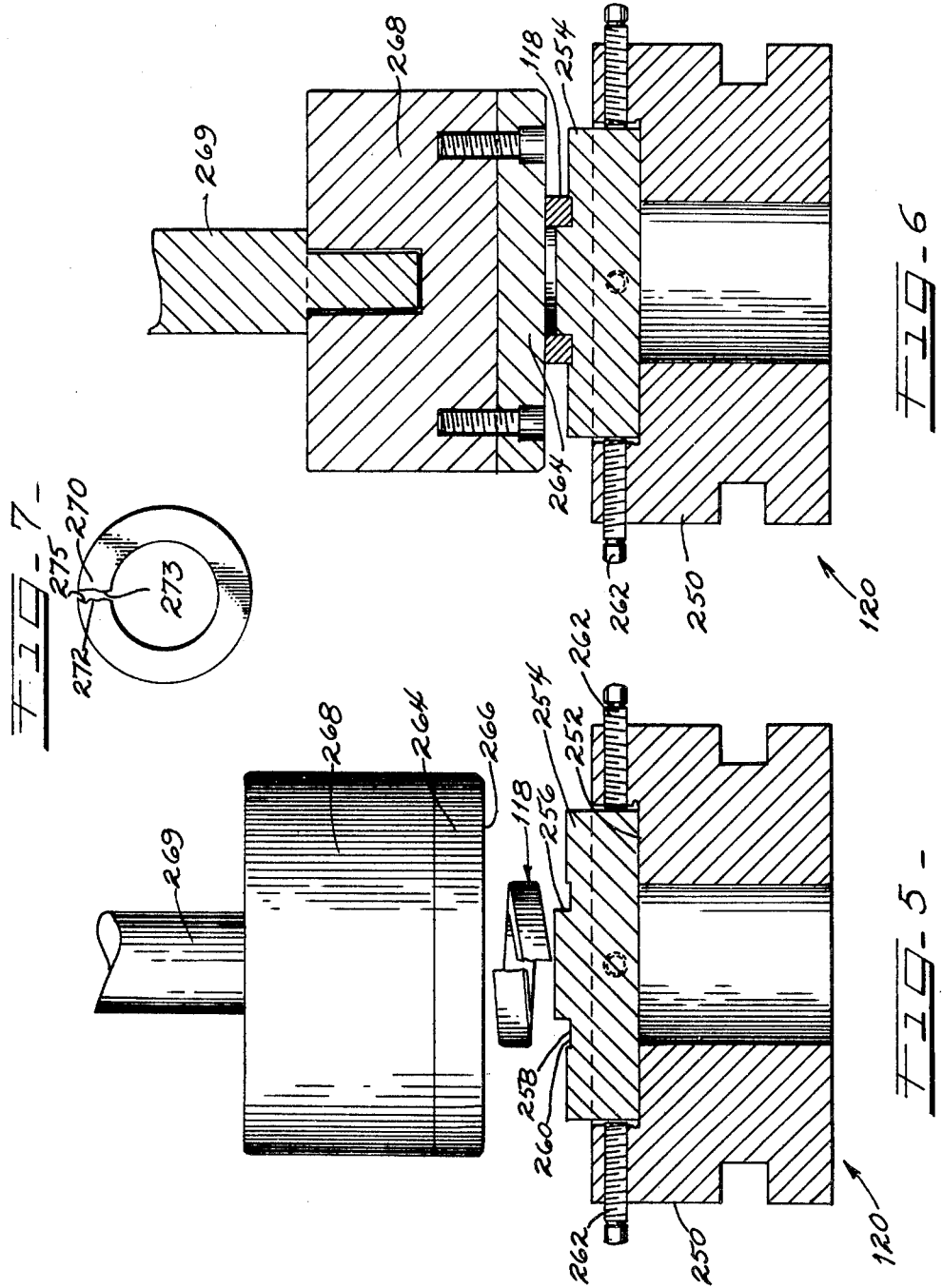

3,501,940
APPARATUS FOR FLATTENING A SEVERED HELIX SEGMENT
Chester C. Moore, Aurora, Ill., assignor, by mesne assignments, to Borg-Warner Corporation, Chicago, Ill., a corporation of Delaware
Original application Sept. 22, 1965, Ser. No. 489,141, now Patent No. 3,373,472, dated Mar. 19, 1968. Divided and this application June 9, 1967, Ser. No. 661,154
Int. Cl. B21d 37/00
U.S. Cl. 72—412          1 Claim

ABSTRACT OF THE DISCLOSURE

Apparatus for making planar a bar element having a lock washer like configuration. The apparatus comprises mating die plates between which the element is compressed.

---

This application is a division of my application Ser. No. 489,141, filed Sept. 22, 1965.

My invention relates to an apparatus for flattening a severed helix segment, and more particularly, to apparatus for flattening a severed helix segment to make locking collars for making ball bearing devices employing inner race rings and a locking collar for securing the inner race ring to a shaft.

Heretofore ball bearing units of the type shown in Richmond Patent 3,189,979, granted June 22, 1965, have been arranged to have their inner races secured to the shaft by set screws or by cam action devices, which not only have tended to cock the inner race somewhat off the axial center of the shaft, but also frequently in a cocked position. This has been the source of an undue amount of vibration on the shaft and bearing, and has frequently resulted in fretting corrosion that causes the inner race to become frozen to the shaft; also, a marring and moving away of the shaft itself frequently results, which sometimes results in having to replace the shaft.

A principal object of the invention of said application is to provide a bearing assembly arrangement in which the inner race may be firmly secured to the shaft in perfect axial alignment therewith.

A principal object of the invention is to provide as part of a method of making locking collars for use in connection with ball bearing assemblies apparatus for splitting a severed helix segment from which the locking collar is made that substantially reduces the cost of manufacture of the bearing and provides a product of uniformly high quality characteristics.

Other objects of the invention are to provide improved procedures in connection with the making of locking collars, and to provide a locking collar arrangement that is economical of manufacture, efficient and long lived in use and susceptible of a wide variety of applications.

Other objects, uses, and advantages will be obvious or become apparent from a consideration of the following detailed description and the application drawings.

In the drawings:

FIGURE 1 is a perspective view, partially in section, showing a completed ball bearing pillow block type unit of the type to which this invention relates, showing the locking collar of this unit displaced from its locking position on the bearing assembly inner race;

FIGURE 2 is a perspective view, partially in section, showing one form of pillow block housing that may be used in the fabrication of pillow block ball bearing units arranged in accordance with this invention;

FIGURE 3 is a side elevational view of a flange type ball bearing unit equipped with the ball bearing assembly of FIGURE 1;

FIGURE 4 is a plan view of the locking collar employed in connection with the ball bearing assembly of FIGURE 1 with parts being shown in section;

FIGURES 5 and 6 illustrate a die arrangement for flattening the lock washer shaped elements or blanks that are formed by employing the apparatus shown in FIGURES 9 and 10 of said application; and FIGURE 7 is a plan view of the locking collar blank as it appears after leaving the die shown in FIGURES 5 and 6.

However, it is to be distinctly understood that the specific drawing illustrations provided are supplied primarily to comply with the requirements of the Patent Code, and that the invention may have other specific embodiments which are intended to be covered by the appended claims.

GENERAL DESCRIPTION OF BEARING UNIT

Referring now more specifically to FIGURES 1–4 of the drawings, reference numeral 10 generally indicates a pillow block ball bearing unit of the type that may be made by practicing my invention.

The bearing unit 10 generally comprises a pillow block type housing 12 provided with an annular housing portion 14 that in the form shown is provided with a spherically contoured bearing seat 16 in which is swivably mounted a ball bearing assembly 18 arranged in accordance with this invention.

The ball bearing assembly 18 comprises an outer race 20 provided with a spherically contoured external surface or periphery 22 that is complementary to and coacts with the housing portion bearing seat 16, an inner race 24, a plurality of bearing balls 26 mounted in the ball race grooves 28 and 30 of the respective races, a suitable type of ball retainer device 32, which in the form shown comprises a pair of rings 34 that are formed and riveted or clamped together in any conventional manner to space the balls 26 equidistantly from each other, and sealing ring assemblies 36 and 38 applied between the inner and outer races on either side of the ball bearing assembly to form a seal for the bearing unit.

The housing 12 further comprises a base 40 provided with a pair of feet or lugs 42 that are formed with suitable openings 44 for the reception of mounting screws or bolts or the like. The annular housing portion 14 of the pillow block housing 12 defines an opening 50, and is connected to the feet or lugs 42 by an upstanding vertical wall portion 46, and in the form shown, the annular housing portion 14 defines end portions 48 and 49 that project beyond the side surfaces 51 of the wall portion 46.

As indicated in FIGURE 2, the end portion 48 of the housing portion 14 is formed with loading slots 56 for receiving preassembled bearing assemblies 18.

The housing 12 as shown in FIGURE 2 may be made in accordance with the teachings of said Richmond patent (the disclosure of which is incorporated herein by this reference), and when so made, is adapted to receive ball bearing assemblies that are assembled in accordance with this invention.

METHOD OF MAKING BEARING UNIT

The housing 12 is cast or formed from a suitable ductile or malleable material, such as ductile cast iron, nodular iron, malleable cast iron, perlitic malleable iron, Meehanite, bronze, aluminum bronze or the like.

The inner race 24 is formed from steel, with the zone of the inner race that defines the raceway 30 being hardened in any suitable manner, leaving the end portions 60 and 62 unhardened, and thus relatively soft as compared to the hardened raceway. The end portion 62 is formed with an annular flange portion or extension 64 of reduced external diameter that is formed with a plurality of slots 66 that extend longitudinally of the axis of the inner race and that are equally spaced about the circumference of the inner race. The slots 66 define resilient gripping fingers 68 that are employed to clamp the inner race 24 to a shaft over which the inner race is received in the normal operating position of bearing unit 10.

The bearing assembly 18 is assembled by taking the inner race 24 and placing it within the outer race 22 and applying a plurality of bearing balls 26 therebetween in any convenient manner. The retaining rings 34 are inserted from the sides of the assembly and are riveted or clamped together in any conventional manner to properly hold the balls 26 in their proper spaced relationship within the bearing grooves. The bearing assembly is then sealed by applying the seal assemblies 36 and 38 in any known manner.

The thus assembled bearing assembly is applied to the housing 12 by turning the assembly so that its plane extends perpendicular to the plane of the housing portion 14, and then inserting the outer race 22 into the loading slots 56 until the center of the outer race is substantially aligned with the center of the bearing seat 16. The bearing assembly 18 may then be rotated 90 degrees into substantial coplanar relation with the housing portion 14, and locking collar 80 arranged and made in accordance with this invention is applied over extension 64 to serve as a device to clamp the inner race to the shaft it cooperates with. Locking collar 80 includes a cap screw 82, that has a threaded portion 84 of its stem or body 86 screw threadedly received in an end portion 88 of the collar so that the collar can be contracted against the fingers 68 to clamp the inner race to a shaft.

The locking collar end portion 88 is recessed or enlarged as at 90, and the other end portion 92 of the locking collar is formed with a bore 94 through which cap screw 82 extends, with the head 96 of the cap screw seating against a shoulder 98 that is defined by a recess 100 formed in the end portion 92.

In use, the bearing unit 10 as shown in FIGURE 1 with the locking collar 80 slipped in place over the fingers 68 is applied to the shaft the bearing unit is to journal by slipping the shaft through the bore 102 of the inner race, and after the shaft and bearing unit have been appropriately positioned with respect to each other, a suitable turning tool is applied to the cap screw 82 to contact the collar 80 against the fingers 68 and draw the fingers 68 into tight clamping engagement with the shaft surface. Cap screw 82 has its head 96 formed with a suitably shaped polygonal indentation 97 adapted to cooperate with a complementarily shaped tool for this purpose.

The result is that the inner race is securely made fast to the shaft in exact axial alignment therewith and without marring or damaging the surface of the shaft in any way.

FIGURE 3 shows a flange type bearing unit 91 that includes flange type housing 93 having a bearing assembly 18 including a locking collar 80 applied thereto. Housing 93 differs from housing 12 primarily in that it is provided with lugs 95 adapted for flange type bearing applications. Unit 91 is otherwise the same as unit 10, as indicated by corresponding reference numerals, assembly 18 being applied through loading slots (not shown) that are the same as loading slots 56 of FIGURE 2. Unit 91 is thus assembled following the same steps described above.

The locking collar 80 is preferably made in the manner more fully described in my said application (the disclosure of which is hereby incorporated herein by this reference), the disclosure of the instant application being directed to the apparatus for flattening the severed helix segment from which the locking collar is formed.

As disclosed in said application, a section of bar stock 110 of square section is applied to a coiling apparatus 112 that is shown in FIGURES 5–8 of said application to coil the bar stock 110 into a tight helix, an example of which is shown at 114 in FIGURE 6 of said application.

The helix is removed from apparatus 112 and is split to form individual lock washer shaped collar blanks by employing the cutting apparatus 116 illustrated in FIGURES 9 and 10 of said application, after which the individual blanks 118 are flattened by employing the die apparatus shown in FIGURE 6 hereof, and then the blanks are individually coined to the final locking collar external and internal diameters by employing the die apparatus 122 shown in FIGURES 15–17 of said application.

The individual locking collar blanks are then processed in the manner indicated in FIGURES 18–23 of said application to form the recesses and holes in the locking collar that receive the cap screw 82, and in the course of this processing, the end portions 88 and 92 of the locking collar are formed with oppositely disposed planar surfaces 124 and 126 (see FIGURE 4) that define the gap 130 between the end portions of the locking collar.

The individual locking collars are then tumbled and coated as may be necessary or desirable, after which the individual cap screws are applied to the respective locking collars.

HELIX SEGMENT FLATTENING APPARATUS

The helix segment flattening apparatus 120 comprises a lower fixed plate structure 250 supporting in a recess 252 a lower die plate 254 which is provided with a stud portion 256 having a diameter approximating the internal diameter of the helix elements. The lower die plate 254 at the base of the stud portion 256 is formed with an annular groove of recess 258 haivng a substantially planar bottom surface 260.

The die plate 254 is held in position in the form shown by suitable set screws 262.

Apparatus 120 also includes an upper die plate structure 264 having a planar working surface 266 that is disposed in a plane parallel to the plane of the recess surface 260. Stud portion 256 is disposed perpendicular to the surfaces.

The upper die plate 264 is affixed to a ram head 268 that is actuated by a suitable ram rod 269 to force the die plate 264 in the direction of die plate 254 when an element 118 is interposed therebetween, and to retract the die plate 264 away from same after the flattening operation has been completed.

In operation, an element 118 in the form shown in FIGURE 5 is placed over the stud portion 256 so that it will rest on surafce 260 of annular recess or groove 258. The ram actuating upper die plate 264 is then actuated to move same to the position of FIGURE 6 to flatten same.

In achieving this end, the ram operating the upper die plate 264 is provided with a pressure sensitive control valve arrangement that initiates a reversal in the movement of the die plate 264 when the pressure has been achieved that will complete the flattening of the element 118 to the desired planar configuration, which is shown in FIGURE 7.

It will be noted that the flattened element 118 still has the end portions 270 and 272 thereof spaced from each other in the flattened condition of the element 118, although the somewhat jagged nature of the surfaces 273 and 274 resulting from the previously described sawing action still remain.

The element 118 is now moved to the separate coining apparatus 122 of my said application for the purpose of giving the element 118 its final external and internal diameter configuration.

It will therefore be seen that I have provided novel and effective ways of making or assembling ball bearing assemblies and units, as well as a novel effective and inexpensive method of making locking collars therefor.

The bearing assembly arrangements shown in FIGURES 1 and 3 not only affix the inner race of the bearing assembly to the shaft in substantially perfect axial alignment with the axis of the shaft, the inner race is firmly clamped against any possible movement by merely suitably positioning the cap screw 82 so that the inner race clamping fingers 68 are drawn against the shaft surface.

As I prefer to apply the ball bearing assemblies 18 to the housings 12 through the housing loading slots 56, the over-all length of the inner race, when assembled to the outer race in the manner shown in FIGURE 1, must not extend at any point beyond the imaginary sphere that is defined by a projection of the contour of bearing seat 16 and outer race surface 22.

The bearing arrangements shown in FIGURES 1 and 3 of the drawings are also adapted for application to undersized or worn shafts and provided an appropriate gripping action even though the shaft tolerance difference may be in excess of two or three thousandths.

The units 10 and 91 represent only several of the specific types of housing units to which ball bearing assemblies 18 and their locking collars may be applied. Furthermore, in some applications it is not necessary that the assembly 18 be swivelly mounted, and in such cases the external surface of the outer race need not be spherically contoured.

It frequently happens that assemblies 18 and their locking collars 80 are sold separately from their housings, in which case the locking collars may be assembled on the respective assemblies 18 for facilitating shipping purposes.

Assemblies 18 may be applied to the housings of FIGURES 1 and 3 by following the methods of Glavan et al. Patent 2,952,898 to provide an alternate method of making these assemblies.

The method of making the locking collar herein disclosed has been found to make it possible to produce locking collars at a fraction of the cost of making them by a straight screw machine operation. Furthermore, machining of the locking collar is held to a minimum and the dimensioning of the internal and external diameters can be achieved with a tolerance and smoothness not possible in employing a screw machine.

The foregoing description and the drawings are given merely to explain and illustrate my invention and the invention is not to be limited thereto, except insofar as the appended claim is so limited, since those skilled in the art who have my disclosure before them will be able to make modifications and variations therein without departing from the scope of the invention.

I claim:

1. Apparatus for making planar a bar element having a lock washer like configuration, said apparatus comprising:

a lower die plate comprising a plate structure formed with an upstanding cylindrical stud having a diameter approximating that of said element, said lower die plate being formed with an annular recess about the base of said stud proportioned to receive said element and defining at its bottom portion a planar annular abutment surface, and an upper die plate comprising a plate structure defining a planar surface disposed parallel to said recess annular surface, said stud having a length that is less than the thickness of said element, and means for compressing the element between said surfaces when the element has been placed in said recess.

References Cited

UNITED STATES PATENTS

| 1,064,339 | 6/1913 | Katzinger | 72—475 |
| 2,909,832 | 10/1959 | Cousino | 10—86 |

FOREIGN PATENTS 519,981 4/1940 Great Britain.

RONALD D. GREFE, Primary Examiner

U.S. Cl. X.R.

10—86; 72—474